United States Patent [19]

Rumpf

[11] 4,344,589
[45] Aug. 17, 1982

[54] TANDEM DUAL SPOOL RETRACTOR STRUCTURE

[75] Inventor: Robert J. Rumpf, Grosse Pointe, Mich.

[73] Assignee: The Firestone Tire & Rubber Company, Akron, Ohio

[21] Appl. No.: 200,030

[22] Filed: Oct. 23, 1980

[51] Int. Cl.³ .................... A62B 35/02; B65H 75/48
[52] U.S. Cl. ............................................. 242/107.4 A
[58] Field of Search .................. 242/107.4 R–107.4 E, 242/107.2; 280/801–808; 297/474–480

[56] References Cited

U.S. PATENT DOCUMENTS

| | | | |
|---|---|---|---|
| 4,065,070 | 12/1977 | Pilarski et al. | 242/107.4 A |
| 4,094,475 | 6/1978 | Takada | 242/107.4 A |
| 4,164,336 | 8/1979 | Higbee et al. | 242/107.4 A |
| 4,195,795 | 4/1980 | Ardizio | 242/107.2 X |
| 4,245,798 | 1/1981 | Steger | 242/107.4 A |

Primary Examiner—John M. Jillions
Attorney, Agent, or Firm—Miller, Morriss and Pappas

[57] ABSTRACT

A tandem dual spool retractor structure having a common frame and non-aligned separate spools with a common sensor acting on non-aligned pawls and where the pivotal actuator is free to rise in slots so as to prevent either spool from blocking the locking of the other spool. The spools are both supported by flanges formed from the one-piece frame. The spools are journalled in flexible plastic brackets which also support the pawl elements and the pawl elements, on lock-up, flex to buttress relation with the frame elements and force transmitting elements are provided on the inboard bearings which supplement the strength of the central or inboard supports.

7 Claims, 7 Drawing Figures

TANDEM DUAL SPOOL RETRACTOR STRUCTURE

The present invention is a new and improved tandem dual spool retractor and including a pawl actuator therefor. In passive restraint systems in which seat belt webbing is oriented to secure drivers and passengers in automobiles, it has become more and more important to provide dual spool retractor services for directing two trains of seat belt webbing, for example, to serve lap and seat belt manipulation. In such arrangements, it is important that a single sensor act for both retractors in the tandem system and in such a way that cooperation occurs in the functioning of both pawls so that there is no way that one of the belts can prevent the other belt from locking. This is especially important where the separate pawls are non-aligned by reason of the lead-out canting of the retractors or spools. Where one retractor serves the shoulder belt and one retractor serves the lap belt in a three-point belt system, it is essential that the lap belt never be prevented from locking by the action of the shoulder belt. It is further desirable that in a tandem dual spool unit that a common frame and common sensor means be provided. The present invention addresses that problem as well in providing a sturdy mounting frame which operably supports two retractor spools in non-aligned relation and where the frame operably supports a pawl for each spool and a single common sensor serving both pawls from a common actuator.

The closest known art is found in the U.S. Pat. No. 4,065,070 to Regis V. Pilarski and Gerald A. Yates and in the U.S. Pat. No. 4,094,475 of Juichiro Takada. The former is typical of dual spool retractors in which a single pawl actuated by a vehicle sensitive sensor locks the two retractors. The axes of the retractors are in separate parallel spaced-apart relation. The latter structure is a phase correcting pawl actuator applied to a single spool against the ratchet wheel or wheels of that spool.

Accordingly, a principal object of the present invention is to provide a single piece frame in support of non-parallel axis positioned spools to form a pair of canted retractors in the single frame and with inboard support elements allowing journalling of the spools with maximum economy.

Another principal object is to provide a pawl actuator which is engageable to actuate two pawls in non-aligned relation and so that in the actuation one pawl lock-up cannot interfere with the second pawl lock-up.

Still another object is to allow flexure of the pawl support allowing the pawl, under lock stresses, to move backward under the positive force of the ratchet teeth to firm buttress lock engagement with the frame.

Other objects, including frame simplicity, economy, and adjustment of frame to desired canting of the axes of plural spools, will be increasingly appreciated as the description proceeds. Finally, the present invention extends the versatility of the tandem dual spool retractor art.

IN THE DRAWINGS

GENERAL DESCRIPTION

Figure 1:
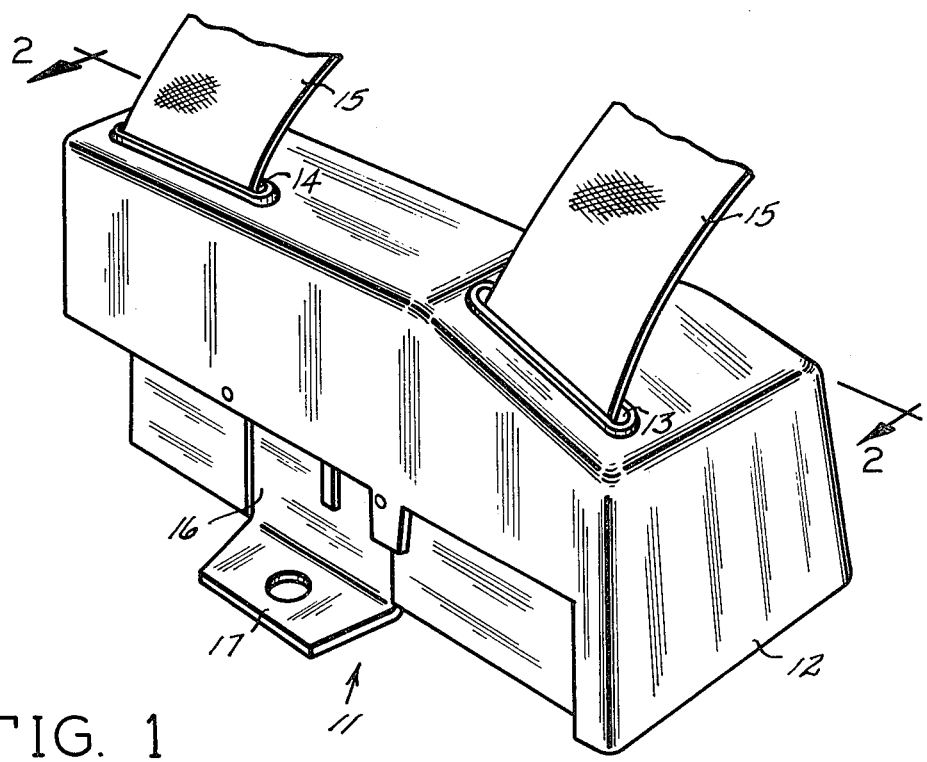
FIG. 1 is a perspective view of a tandem dual spool retractor in accord with the present invention and supported on a common frame inside a protective boot with the webbing led out through two openings.

In general, a single inertial sensor is poised below and between a pair of non-aligned pawls serving a pair of non-aligned retractor spools. The sensor element includes an actuator lever engaged with a pendulum and the lever is pivotally and slidably mounted in a pair of spaced-apart bearings and including spaced-apart contact arms engageable, upon displacement, with the two pawls. A tandem dual spool retractor is thus provided in which a one-piece frame supports two non-aligned or askew retractor spools or drums. Inboard and outboard journal stanchion supports are provided by a pair of integral outboard non-parallel flanges and a pair of inboard non-aligned non-parallel integral stanchions lanced from the web of the frame and forming the inboard bearing supports for retractor spools or drums. In each pair of stanchions, the inboard stanchion is parallel to and offset from the outboard stanchion. Load transferring supports supplement the strength of the inboard stanchions where the strength of the inboard stanchions requires increase and the inboard stanchions transmit the lock-up stresses into the frame. The axles or shafts of the spools are keyed to the ratchet flanges and the central drum and one axle is extended between each pair of inner and outer trunnion supports providing load bearing elements. Each axle end is journalled by a plastic journal sleeve and bracket combination which alignably and resiliently supports pawl elements therebetween. Lock stresses on the pawl at engagement with the spools cause the plastic brackets to flex and the stresses are carried, then, into the frame.

Retractor spring motors and housings therefor are mounted on the stanchions and engage the axles of the spools urging the spools to rewind any belting secured thereto. The pawls rest in the plastic brackets or sockets and the outer brackets are supported by one arm in window slots in the upturned stanchions. The inner brackets allow the extension of the pawl elements through the pawl retention sleeve so that flexure can occur between the arms of the pawl support brackets and the inner brackets clip to the respective stanchions. The pawls rest in butterfly slots in the sockets of the brackets so that tilting can first occur and after engagement with teeth of the ratchet flanges, resilient displacement can occur with resultant stress transmission directly to the frame.

Between the inner stanchions and beneath the center extensions of the pawls, is located a pendulum element in engagement with an actuator lever element. Upon sensing inertial imbalance, as in a sudden change in acceleration as by stopping and sudden starting, the pendulum sensor element displaces the actuator lever element as eccentrically poised on spaced-apart eccentrically located pivots. This causes the actuator lever to raise to engage the pawl elements which are thus tilted toward engagement with the ratchet teeth on the spool ratchet flanges. This achieves locking of both spools. The pivot support of the actuator lever is vertically slotted so that resistance in any form to the tilting of the actuator by the pawls causes an advanced rising in the other pivot point in the slots. This action results in prevention of either of the spools from blocking the lock-up of the others and a superior performing tandem dual spool sensor system results which is especially amenable to the performance demands of lap and shoulder belts in automatic passive restraint three-point systems.

SPECIFIC DESCRIPTION

Referring with particularity to the drawings and first reference directed to the FIG. 1 thereof, the tandem dual spool retractor 11 of the present invention is seen as housed in a plastic cover or boot 12 which has elongate openings 13 and 14 through which the webbing 15 is guidably extendable and retractable and the webbing 15 is lead to safety harness, not shown, and usually of the three-point type where one of the extensions of the webbing 15 may serve a lap belt portion of a harness and the other extension 15 may serve a shoulder belt portion. In some installations the webbing 5 is broken into separate but slidably integrated courses but the terminal ends are served by the dual spool retractor 11. As will be understood by those skilled in the art, the webbing may be variously attached to terminal connectors and webbing flow directors which form no part of the present invention. The frame 16 of the retractor 11 includes the tang or anchor 17 by means of which the retractor 11 can be firmly secured to a structural portion of a vehicle such as an automobile and in selected relation to a seat for the support of occupants. The boot 12 serves a decorative purpose, a guidance purpose, and a protective purpose and the latter in prevention of physical interference with or obstruction of the spools and their locking mechanisms.

Figure 2:
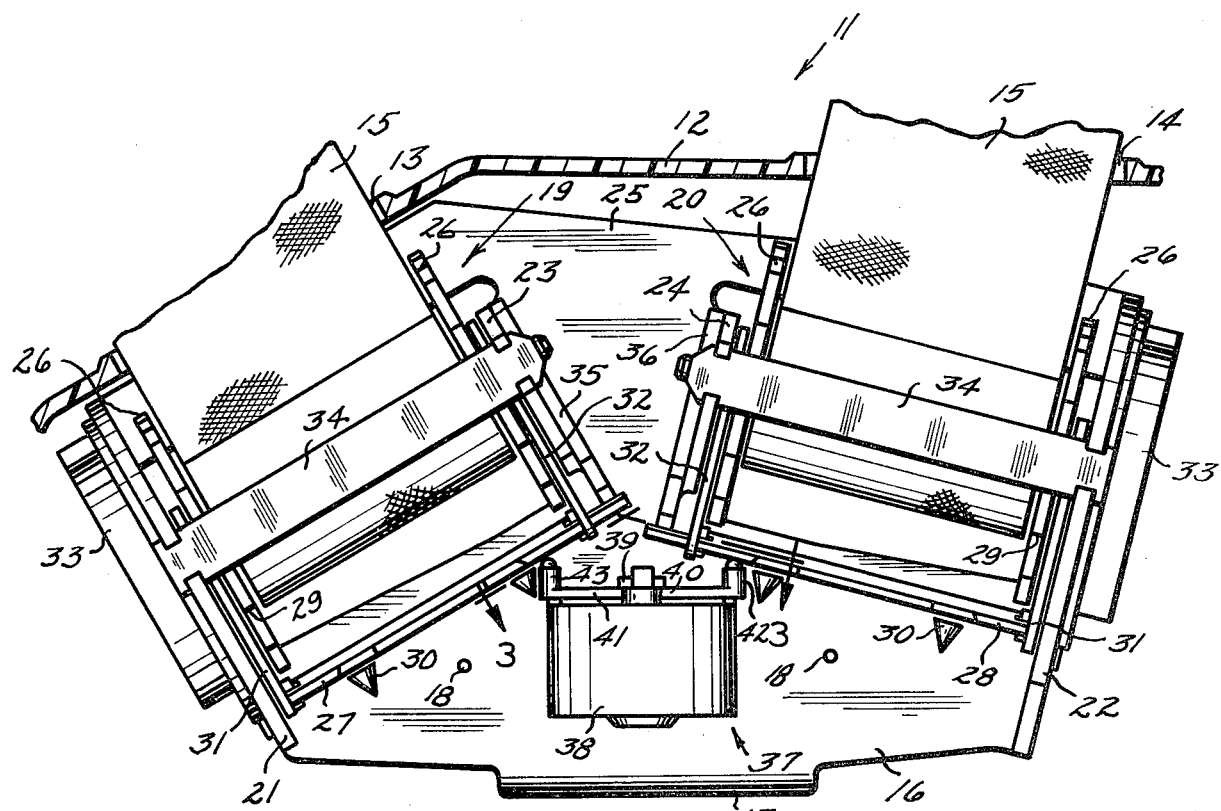
FIG. 2 is a full section view through the boot of FIG. 1 and revealing the tandem retractor with the two spools on an integral frame and the spools is askew or non-aligned relation and with an inertial sensor intermediate the spools and the sensor acting on a common lever engageable against both pawls.

In FIG. 2 the boot 12 has been cut away to reveal the retractor 11 in the common frame 16. Fastening of the boot 12 to the frame 16 is by means of rivets or other fasteners 18 passing through boot 12 and frame 16 and the location may be varied to suit specific installational configurations. The boot 12 must provide operating clearance for the apparatus housed by the boot 12 while permitting anchorage and proper webbing or belt guidance. In this connection, the location and orientation of the retractor 11 in any specific vehicle may also require relocation of the tang 17 but the metal shock of the frame 16 is easily configured to suit any particular anchoring arrangement. Inside the boot 12 are the two spools 19 and 20 and these are operably journalled between four stanchions 21, 22, 23, and 24. All four of the stanchions are integrally formed from the stock forming the frame 16. This reduces the former weight found in dual spool retractors where separate retractor elements were secured to a separate base. The outboard stanchions 21 and 22 are formed by bending the stock of the web portion 25 of the frame 16 upward. The inboard stanchions 23 and 24 are lanced from the web 25 of the frame 16 and are also turned upward. The consequent stanchions 23 and 24 remain integral with the frame web 25. Thus, the pair of stanchions 21 and 23 form parallel spaced-apart journal supports for the spool 19 and the pair of parallel spaced-apart stanchions 22 and 24 form the journal supports for the spool 20. The spools 19 and 20 are provided with ratchet flanges 26. The spools 19 and 20 are served by separate pawl bars 27 and 28 which lockably engage the teeth 29 of the ratchet flanges 26 when they are elevated as by tilting to engagement therewith. As shown, the pawls 27 and 28, when stressed by lock-up conditions against the teeth 29, buttress against the web 25 of the frame 16 and against the formed frame-integral buttress shoulders 30. Movement of the pawls 27 and 28 at engagement of the teeth 29 is by means of the resilient saddles 31 (outboard) and 32 (inboard) in the form of brackets. The plastic saddles 30 and 32 pivotally support the pawls 27 and 28 and flex to allow the engagement of the pawl bars 27 and 28 against the frame 16 and shoulders 30 when locking occurs.

Spring motors shown in their protective housing 33 are secured to the stanchions 21 and 23 and to the respective spools 19 and 20 urging the spools to rewind all webbing 15 thereupon while allowing extension therefrom upon overcoming the spring bias. As webbing 15 is withdrawn, the spring motor is wound tighter. The spring motor thereafter urges webbing return to the spools 19 and 20 by application of a return rotating bias.

Reinforcement bars or spreaders 34 are positioned intermediate the inboard (23 and 24) and outboard (21 and 22) of the stanchions and are crimped thereto on assembly in support of the structure of support frame 16. Interlocked with the inboard stanchions 23 and 24 are supplemental stanchion supports 35 and 36 which, as will be seen, also provide extra inboard journal support for the spools 19 and 20, respectively. By engagement against the frame 16, the stresses applied to the supplemental stanchion supports 35 and 36 are transmitted into the sturdy frame 16.

As will be appreciated, this arrangement using a common frame 16 in support of plural spools 19 and 20 also allows the spools 19 and 20 to be selectively canted in respect to each other in an askew and non-aligned relation while allowing actuating control from a common actuator or sensor element 37 located between the spools 19 and 20 and operably engageable against the pawls 27 and 28. In such non-aligned spool relationships it is most important that one pawl not interfere with lock-up contact of the other pawl. The sensor bracket 38 is secured to the frame 16 by means of a bayonet slot-like arrangement in the cruciform slot 39 and the actuator lever 40 is poised above the pendulum sensor element or spaced-apart vertical slotted pivots so that as the actuator lever 40 rises, any obstruction to the rise will allow the other of the pivots to elevate and engage the pawl elements 27 and 28 and lift the pawls against the ratchet teeth 29. The actuator lever contact bar 41 extends outwardly to positions beneath both of the pawls 27 and 28 and the risers or lift extensions 42 and 43.

Figures 3, 4, 5:
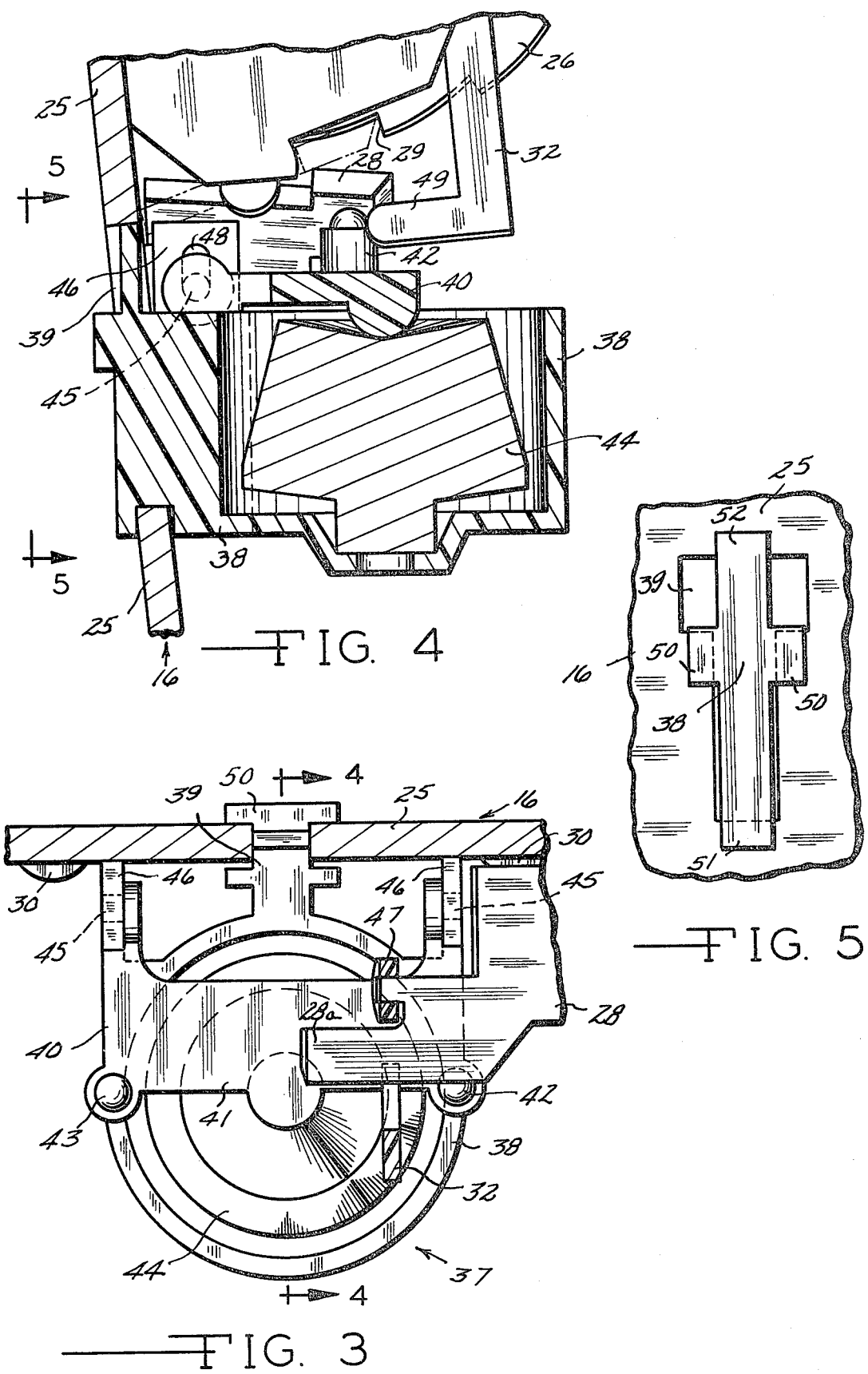
FIG. 3 is a top plan detailed section view taken on the line 3—3 of FIG. 2 and indicating the mounting of the sensor, the sensor lever, and engagement with one of the pawls.
FIG. 4 is a side elevation section view taken on the line 4—4 of FIG. 3 and indicating the vertical slots in the journal mounting which allow the lever pivots to lift independent of each other.
FIG. 5 is a partial rear elevation view of the webbing portion of the frame and indicating the cruciform opening and the sensor mounting bracket secured therein.

In FIG. 3, the sensor element 37 is seen as a pendulum element 44 in the sensor bracket 38. Normally it rests in a vertical orientation in the basket-like bracket 38.

When displaced inertially it leans over or tilts in the basket-like bracket 38. The bracket 38 is fastened to the web 25 of the frame 16 in the bayonet slot of the cruciform opening 39. Overlying the pendulum element 44 is the actuator lever 40 which is hinged at one end on the coaxial spaced-apart pivot pins 45 which extend into the spaced-apart vertical slots in the pivot support ears 46, which ears 46 project vertically from the bracket 38 and adjacent the web 25 of the frame 16. The spaced-apart risers or lift extensions 42 and 43 rise upward from the arm or bar 41 of actuator lever 40 to engage the pawls 27 and 28. Pawl 28 is so arranged for engagement in the FIG. 2 (and specifically the pawl extension 28a is poised over the riser 42) for engagement with the lever 40 when the pendulum 44 is tilted. Also in FIG. 2, the inboard saddle or bracket 32 is partially visible and the butterfly socket 47 is in pivot support of a rectangular inboard end of the pawl bar 28. The butterfly socket 47 is integral with the saddle element 32 and the saddle element 32 flexes in the direction of the web 25 of the frame 16 when the pawl bar 28 is tilted into locking engagement with the spool 20. Under such stresses, the pawl bar 28 displaces the saddle 32 and travels toward contact with the web 25 and the buttress shoulders 30 prevent any slip of the bar 28 on the frame 16. As will be appreciated, this movement translates stresses directly to the frame 16 and all of the saddle pieces cooperate in the pivoting of the pawls 27 and 28 and the flexural shifting of the pawls 27 and 28 against the frame 16.

FIG. 4 best illustrates the vertical slots 48 provided in the ears 46 and which allow pivoting of the actuator lever 40 and to allow limited adjusted lift upon engagement with any obstructions by the lever 40 and the risers 42 and 43. As the pivots 45 rise in slots 48 when an obstruction is encountered, one pivot 45 stops or posts and the other pivot 45 rises coordinately adjusting so that locking always occurs. Also shown is the toe piece 49 of the saddle element 32. This prevents droop of the pawl 28 by preventing the pawl 28 from pivoting beneath the bar pawl extreme position and assures that no contact with the pawl bar 28 will occur until the pendulum 24 elevates the lever 40 as by tilting in the bracket 38. The elevated engagement of the pawl bar 28 with the teeth 29 on the ratchet flange 26 of the spool 20 is shown in phantom line and this kicks the pawl bar back to engagement with the rear wall formed by the web 25 of the frame 16.

In FIG. 5 the bracket 38 is seen wedged into the bayonet-like cruciform slot 39 in the web 25 of frame 16 and the wing-like protrusions 50 bracedly grip the vertical wall and the foot 51 of the bracket 38 and head 52 achieve a locating security against the frame 16.

Figure 6:
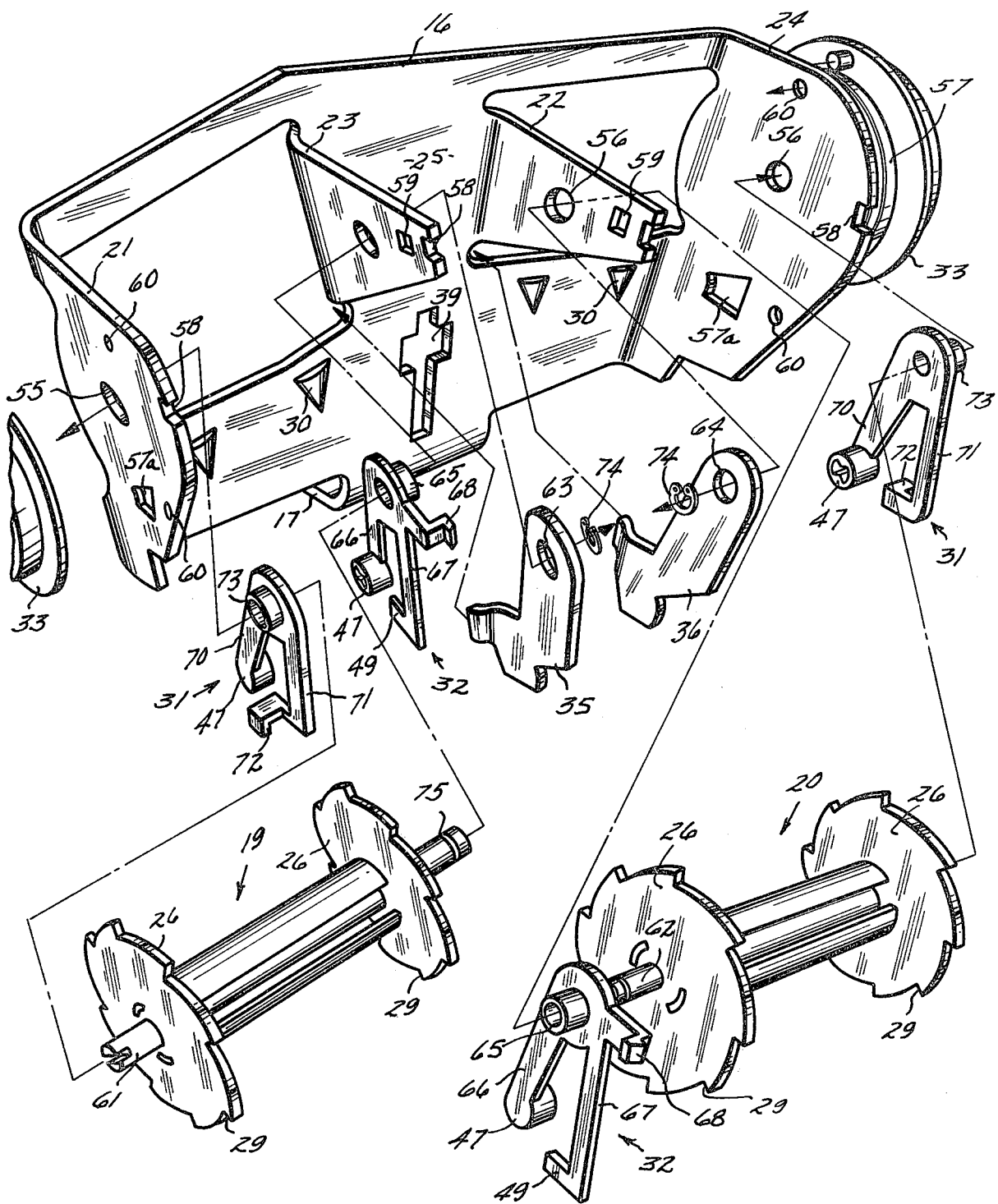
FIG. 6 is an exploded perspective view of the retractor in accord with the present invention with the webbing removed from the spools and arranged to indicate the assembly relations.

In FIG. 6 the assembly relationship of the tandem dual spool retractor 11 is best understood and the construction details of the interrelated parts can be seen. The frame 16 with stanchions 21, 22, 23, and 24 is integrally formed from the blanked web 25 and is stamped, pierced, lanced, and formed to the shape indicated. In the flat, the aligned pairs of journal openings 55 and 56 serving the two pairs of stanchions 21, 22, 23, and 24 are pierced along with the arcuate windows in the cruciform slot 39, the spreader clinch openings 58, the saddle support rectangular openings 59 and the spring motor housing connector openings 60. The shoulder buttresses 30 are lanced. Then the stanchions 21, 22, 23, and 24 are formed upwardly and the buttresses 30 are shaped, the journal openings 55 and 56 providing gauge-control in the forming. This establishes non-aligned or askew relation between adjacent spools 19 and 20, as seen. The spools 19 and 20 on shafts 61 and 62, respectively, are journalled in the respective sets of openings 55 and 56 and in the saddles 31 (outboard) and 32 (inboard). The slotted ends of the shafts 61 and 62 extend to connect with the spring motors 57 in the motor housings 33. The housings 33 are connected to flanges or stanchions 21 and 23. The inboard stanchions 22 and 23 are additionally supported by the supplemental supports 35 and 36 which are pierced at openings 63 and 64 to registrably receive and support the shafts 61 and 62 and the journal sleeve extensions 65 of the inboard saddles 32. On assembly, the supports 35 and 36 are maintained in parallel contact against the inboard stanchions 22 and 23 and rest against the web 25 of frame 16. As will be appreciated, the saddles 32 are in left and right forms and each includes a pair of arms 66 and 67. The arms 66 include a butterfly socket 47 which pivotally supports the rectangular inboard ends of the pawl bars 27 and 28. The arms 67 include the pawl drop limiting toe 49 and an offset dog 68 extends for snapping into the rectangular openings 59 in the inboard stanchions 22 and 23. The saddles 32 and 31 are made of plastic with good resilience and memory property.

The saddles 31 (outboard) include one arm 70 which supports the butterfly integral sockets 47 which are registrably aligned with the identical opposite facing sockets 47 in the saddle 32. The arm 71 includes an offset integral book element 72 which is snapped into the arcuate windows 57a and the saddle 31 includes a bearing sleeve 73 which projects into the openings 55 and 56 in support of the shafts 61 and 62 at the outboard ends thereof. The snap rings 74 act as shaft retainers in the ring grooves 75 and 76 on the inboard ends of the shafts 61 and 62, respectively.

Figure 7:
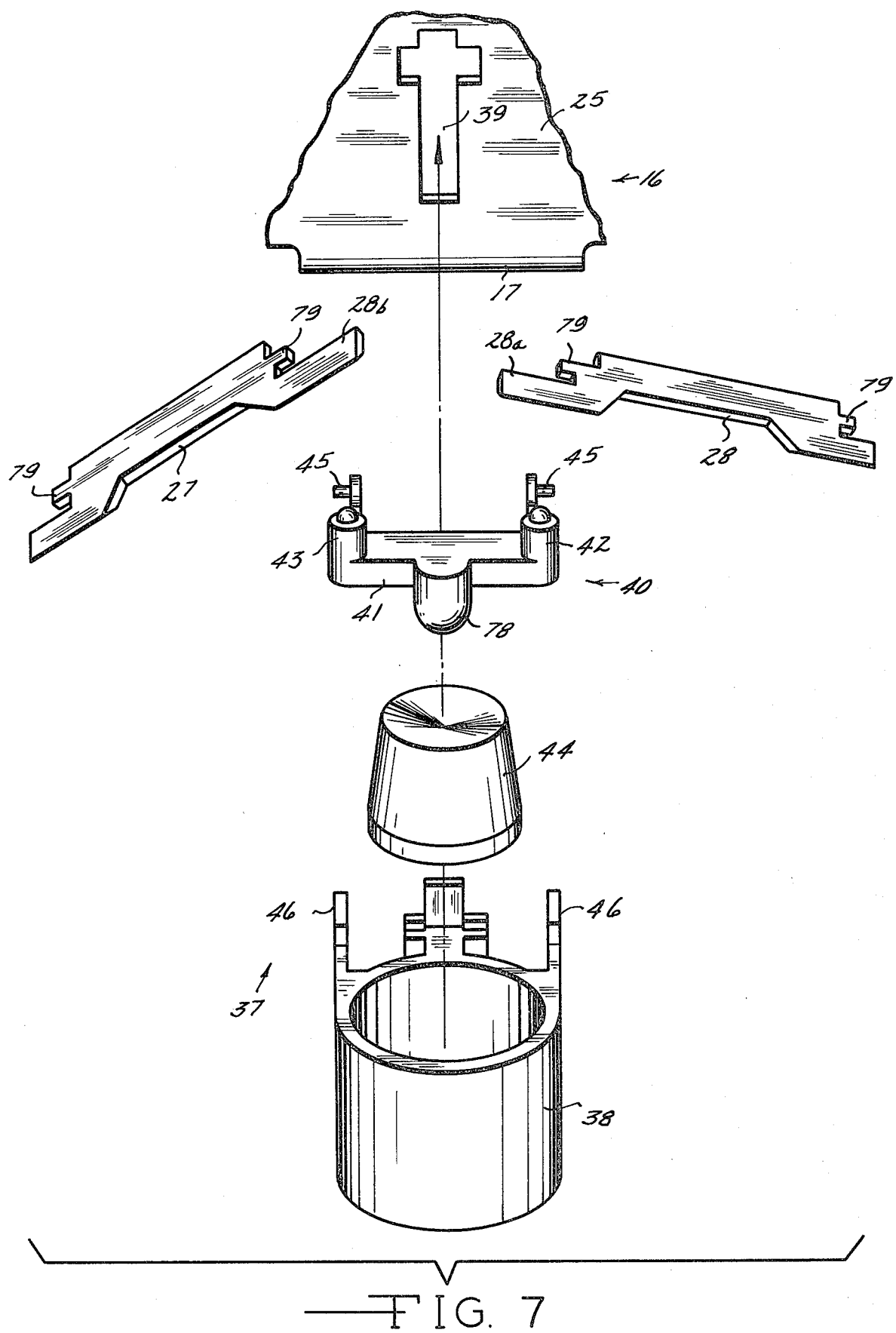
FIG. 7 is a perspective view of the sensor, sensor lever, and pawl assembly relationship and support of the sensor bracket in the cruciform opening in the frame.

In the FIG. 7 the pawls 27 and 28 are indicated in assembly preparation relation to the sensor element 37 comprising the pendulum support or sensor bracket 38, the actuating lever 40 and the pendulum 44. As described best in FIGS. 3, 4, and 5, the sensor bracket 38 is wedged into position in the cruciform opening 39 in the web 25 of frame 16 and this secures the bracket 38 to the web 25 between and beneath the askew axised or non-aligned spools 19 and 20. The upstanding ears 46 contain the vertical slots 48 (FIG. 4) and the pivots 45 extend into the spaced-apart grooves or slots 48 and the pivots 45 hinge the actuator lever 40 to the bracket 38. The pendulum 44 is placed in the cage of the bracket 38 and the depending lobe 78 of the actuator lever is in constant following contact with the top of the pendulum 44. The spaced-apart risers 42 and 43 on the arm portion of the lever 40 extend beneath the extensions 28a and 28b of the lock bars 27 and 28. The pawl elements 27 and 28 are fulcrumed in the butterfly slots of the butterfly sockets 47 of the saddle elements 31 and 32 (FIG. 6) on the rectangular extensions 79. As the pendulum 44 is displaced, the lever 40 is pivoted on the pivots 45 which may both rise in the vertical slots 48 in the mounting support ears 46.

The vertical slots 48 assure that the lever 40 will rise to move the pawl elements 27 and 28 into locking engagement with the teeth 29 of the ratchet flanges 26 in a simultaneous manner despite any momentary interference since the lever 40 admits of a rising action allowing the following pivot 45 to catch up with movement of the leading pivot 45 and in prevention of either pawl 27 or 28 from jamming the other where a common sensor 37 is employed.

The positioning of the tandem dual spool retractor in a vehicle should be such as to assure a normal vertical axis position for the pendulum 44 and in other respects the askew angle can be substantially varied and the relative sizes of the elements may be adjusted to suit the use environment of the device.

Plastic parts are made possible in the saddle elements 31 and 32, the lever 40, the sensor bracket 38, and the covers 33, as well as the boot 12. Substantial weight reduction is experienced since the integral frame 16 supporting two spools 19 and 20 and related apparatus requires no extra mounting stock and the simple, lightweight, easily mounted and assembled sensor structure 37 serves both spools 19 and 20 askew at selected comfortable guide angles for extension and retraction of safety belt webbing and with an effective, simple lock-up means.

The vertical slots 48, allowing rising as well as pivoting of the actuator lever 40 where two pawls 27 and 28 are acted upon by a common sensor 38, assures excellent performance with repetitive reliability and reduction of criticality of dimensioning in the relation of sensor 38 to pawls 27 and 28.

Having thus described my invention and one operative and preferred embodiment thereof, those skilled in the art will readily perceive improvements, changes and modifications and such improvements, changes and modifications are intended to be included herein limited only by the spirit of my hereinafter appended claims.

I claim:

1. A tandem dual spool retractor having a pair of spaced-apart and non-aligned askew webbing spools each having separate rewind mechanisms and non-aligned pawls projecting generally towards each other and each mounted for tilting movement into lock engagement with its associated spool, the combination comprising:
    an inertial sensor below and intermediate said spools;
        a liftable lever element journalled for pivotal and vertical movement in two spaced-apart journals having vertically elongated slots, said sensor upon displacement by inertia elevating said lever element to substantially simultaneous engagement with said pawls and tilting said pawls into lock engagement against said spools.

2. In a tandem dual spool retractor having a pair of spaced-apart spools in spaced-apart and non-aligned askew axial relation to each other, each having separate rewind mechanisms and a separate pawl acting against one or more ratchet flanges and both spools in a common frame, the combination comprising:
    an inertial sensor element intermediate the said spools;
    a lever element in contact with said inertial element and displaceable thereby, said lever element having spaced-apart aligned pivot extensions;
    a pivot support mount having a pair of spaced-apart aligned vertical slots and into which said pivot extensions are positioned; and
    pawl extensions projecting from said pawls and in interference relation with said lever whereupon any blockage of movement of said lever on one pivot permits vertical extension of the other of said pivots.

3. In the combination of claim 2 wherein said pawls are supported in resilient brackets to flex until said pawl elements engage said frame.

4. In the combination of claim 3 wherein said bracket element also includes journal means supported in said frame and said journal means in support of said spools.

5. In the combination of claim 4 wherein a platform for said inertial sensor element is slidably and lockably attached to said frame and includes said vertically slotted pivot mounts.

6. In the combination of claim 5 wherein said lever includes lift extensions engaging said pawl extensions at selected points of displacement of said lever and subject to the action of said pivots in said slots.

7. A tandem dual spool retractor comprising:
    a frame having two pairs of integral upstanding stanchions, the inboard of said stanchions being in non-aligned askew relation to each other and lanced from the web portion of said frame and said pairs of upstanding stanchions defining journal support openings, and the outboard of said stanchions having an arcuate window therethrough and said web portion of said frame including a cruciform slotted opening between said inboard stanchions;
    a pair of supplemental stanchion supports, one attached to each inboard stanchion and including an opening corresponding to said journal support opening in said inboard stanchions and interlocking against said web portion of said frame whereby lock stresses applied to a thrust buttress portion of said supplemental supports are transmitted into said frame;
    a spring loaded retractor spool operably supported by each pair of said stanchions in non-aligned journalled relation and said spools including webbing thereon biased to wound up retraction thereon;
    inboard and outboard journal saddles supporting said spools in said stanchions, one arm of said saddles including a stop against said frame and the other of said arms resiliently supporting a butterfly socket;
    a pawl in operable relation to each of said spools and secured in respective of said butterfly sockets and each of said pawls including an inboard eccentric extension projecting from said inboard stanchions;
    a sensor bracket secured to said web at said cruciform slot and beneath said pawl extensions having vertically slotted journal openings on each side of an inertial element supported in said bracket; and
    a lever pivotally supported in said vertical slots and in displaceable relation by said inertial element, said lever including lift extensions registrably engageable with said pawl extensions.

* * * * *

UNITED STATES PATENT AND TRADEMARK OFFICE
CERTIFICATE OF CORRECTION

PATENT NO. : 4,344,589
DATED : August 17, 1982
INVENTOR(S) : Robert J. Rumpf

It is certified that error appears in the above-identified patent and that said Letters Patent is hereby corrected as shown below:

Column 2, line 1, "is" should read --- in ---

Column 3, line 36, "5" should read --- 15 ---

Column 3, line 61, "shock" should read --- stock ---

Column 6, line 31, "book" should read --- hook ---

Signed and Sealed this

Eighth Day of May 1984

[SEAL]

Attest:

GERALD J. MOSSINGHOFF

Attesting Officer

Commissioner of Patents and Trademarks